Dec. 2, 1969  J. V. KIDD  3,480,984
PIG APPARATUS
Filed June 17, 1968
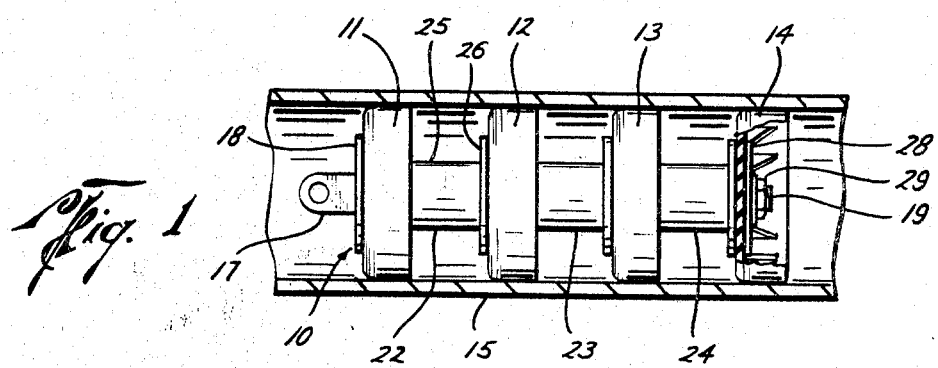
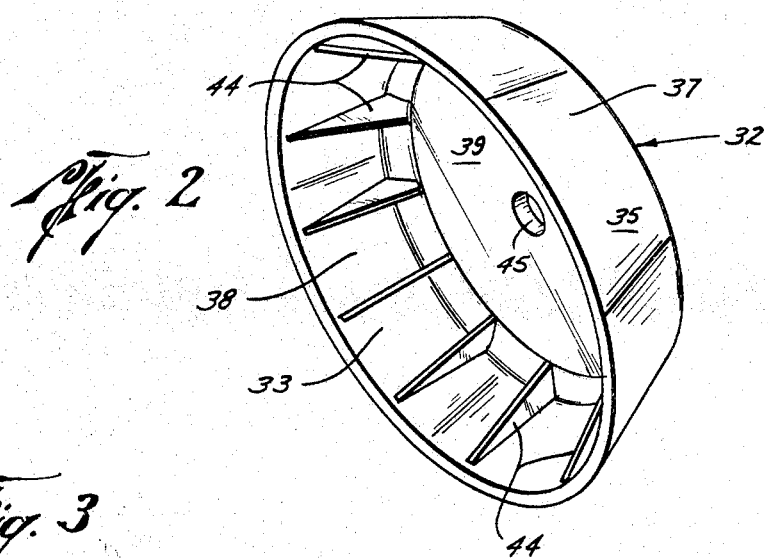
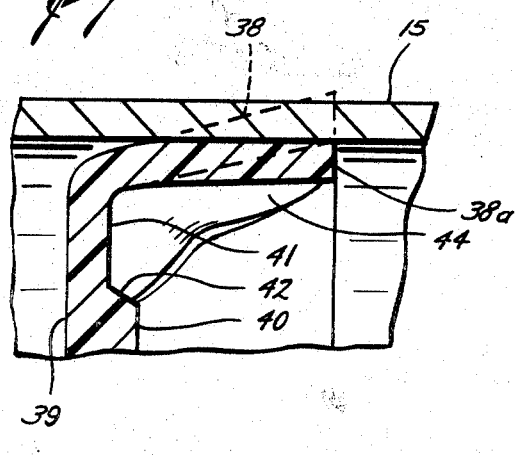
Joseph V. Kidd
INVENTOR.
BY Carl B. Fox, Jr.
ATTORNEY

United States Patent Office 3,480,984
Patented Dec. 2, 1969

3,480,984
PIG APPARATUS
Joseph V. Kidd, 201 Shasta, Houston, Tex. 77024
Filed June 17, 1968, Ser. No. 737,453
Int. Cl. B08b 9/06
U.S. Cl. 15—104.06                                6 Claims

ABSTRACT OF THE DISCLOSURE

The disclosure is of pig apparatus of improved form. In the operation of pipelines, pig apparatus is employed for a number of purposes, such as for construction cleaning and other cleaning of pipe lines, water displacement, scale removal, removal of deposits such as paraffin, salt, etc., for gauging, for "batching," and for many other purposes. The pigs herein disclosed include cuplike elements, which are usually employed in plural assemblies, with or without brushes or other accessories. The cuplike pig elements or bodies herein disclosed differ from those heretofore employed in that surrounding flange or rim portion is reinforced by plural radial vane elements whereby the strength, resiliency characteristics, and useful life of the elements are improved.

BACKGROUND OF THE INVENTION

Field of the invention

The field of the invention is the field pertaining to pig apparatuses, in particular, pig apparatuses having cup-shaped elements usually plurally mounted on a rod or shaft, and employed for various purposes in pipeline cleaning and operation.

Description of the prior art

Pig elements of the general type of this invention are known in the art. Without exception, the known pig elements include surrounding rims of elastomeric material which are inwardly and outwardly uniform and smooth, and in which the wall thickness is determinative of the resiliency with regard to a particular elastomeric material, In use, such pig elements wear rapidly and unevenly and have a short useful life, primarily because the surrounding wall is subject to excessive inward distortions permitting the pig apparatus to become in off-center position in the pipeline whereby wear is concentrated at certain portions of its periphery.

SUMMARY OF THE INVENTION

In the pig apparatus provided according to the invention, the cuplike pig elements are reinforced at the surrounding flange or wall by a plurality of circular spaced radial webs or gussets. The reinforcing elements strengthen the surrounding wall and improve its resiliency characteristics such that the useful life of the elements is greatly extended. The poor wearing characteristics, mentioned above, of pig elements known in the art are caused in large measure by the fact that, once wear has occurred at an outside area of the surrounding wall of such a pig element, the surrounding wall is not sufficiently biased outwardly to compensate so that a bypass area occurs past the pig in a pipeline. In other words, once wear at an area has occurred, it is not compensated by outward biasing of the wall to maintain the necessary seal. In addition, the pig elements of the prior art tend to become worn in lopsided fashion, over only portions of their peripheries, because the resilience of the surrounding wall portion is not of sufficient radial extent to cause them to remain precisely centered in the pipeline. The pig bodies afforded according to this invention are snugly and compressedly fitted within the pipeline, and the outward resilient bias of the surrounding wall is sufficient that the pigs remain precisely centered and wear occurs uniformly therearound. As the pig wears at its exterior, uniformly completely around its periphery, the reinforcing elements bias the surrounding wall outwardly uniformly so that the pig will continue in useful condition until such time as the surrounding wall portion becomes completely worn through. The useful life of the pigs is very greatly improved, up to four or five times the useful life of comparable pigs of heretofore known forms.

BRIEF DESCRIPTION OF THE DRAWINGS

FIG. 1 is an elevational view showing a set of four interconnected pig bodies disposed within a section of a pipeline, the pipeline being shown in vertical cross section, and one of the pig bodies being shown partially broken away to show the apparatus employed for holding the several pig bodies together as a unit.

FIG. 2 is a perspective view showing a pig body of the type shown in FIG. 1.

FIG. 3 is a partial vertical cross sectional view taken at one side of the pig body shown in FIG. 2, showing the resilient distortions of the pig body when installed in a pipeline for use.

DESCRIPTION OF THE PREFERRED EMBODIMENTS

Referring now to the drawings in detail, in FIG. 1 there is shown an assembly 10 of plural pig bodies or elements 11–14 disposed within a pipeline 15.

A perforate nose fitting 17 is secured, as by welding, to a nose plate 18 from which extends rearwardly a centered rod 19 which is threaded at least at its end portion. Between adjacent pig bodies 11–14, there are disposed the spacing members 22–24, each in the form of a spool with a longitudinal pipe section 25 and end flanges 26 at each end. The end plates 26 at the forward ends of the spacers are within the cup recesses of the pig elements and are not shown, but are identical with the rearward plates 26. To maintain the spacers centered in the pipeline, and with respect to the pig elements, the spacer flanges and pig elements are provided with openings closely fitted about rod 19. A rear plate 28 is disposed about rod 19 at its terminal end, and secured by a nut 29.

The above described manner of assembling the pig element is not to be deemed as limiting the invention, as many methods of assembly are commonly employed, such as for example, the use of plural circularly equally spaced rods disposed through the peripheral portions of the flange plates. The flange plates of the spacers may be of any desired diameter and thickness, and may include cutouts for weight reduction, and may be of any of the forms known in the art. Any manner of suitably connecting the individual pig elements together in longitudinally spaced fashion is satisfactory for use in the invention.

Each of the pig elements 11–14 shown in FIG. 1 is of the form of the pig element 32 shown in FIGS. 2 and 3. The pig elements are of cup or dished shape providing an interior space indicated by reference numeral 33. The surrrounding wall or flange 35 forming the sides of the pig element has conically tapered outer and inner surfaces 37, 38, respectively, when the pig element is undistorted by insertion into a pipeline. The circular wall 39 is shown to be thickened at its central circular portion 40 and thinned or relieved at its outer annular portion 41. The juncture of portions 40, 41 may be tapered conically as at 42, or may be at any other angle including cylindrical. A central opening 45 to receive rod 19 may be provided of any required size, or, instead, a plurality of openings at other locations and in other arrangements may be provided. These may be provided by cutting or drilling at time of use.

Around the interior side of surrounding wall 38 there are provided a plurality of equally circularly spaced reinforcing elements 44, of the form of flat triangular gussets, each disposed radially of the pig body, and the plane of each being radial with respect to the axis of the pig body and of a pipeline in which it is disposed. The gussets 44 may be of any desired thickness to give the required outward resilient bias to the outer flange 38. The gussets may be provided in any desired number and circular spacing, and may be provided in the form of close pairs or other multiples circularly spaced with regard to other similar or dissimilar units or sets of gussets around the interior periphery of wall 38. As shown, the gussets each extend outwardly from a line connecting the edge of wall portion 40 to the terminal edge portion of flange or wall 38. The pig elements are of integral structure, the gusset plates being integral with both the circular wall 39 and with the surrounding wall 38, these latter being integral one with the other.

It has been the practice in this field of art to provide pigs of different forms depending upon the use to which the pig is to be put. In other words, batching pigs have been of one form, while cleaning pigs have been of other forms, and displacement pigs of still another form. However, it has been found that the pigs provided according to this invention are of universal characteristics and are suitable for any of the varied uses and services employed by the industry. Therefore, in addition to its other advantages, the invention provides pig elements having the described variable utility, which results in economies both in use and in providing stocks of the pig elements. The pig elements, of course, are made in different sizes for use in pipelines of different sizes.

Referring now to FIG. 3 of the drawings, the disposition of a pig element in a pipeline is further clarified. In FIG. 3, the relaxed or "free" position of the outer wall shown by dashed lines is indicated by reference numeral 38, and the distorted position is indicated by reference numeral 38a. As is indicated by FIG. 3, the relaxed shape 38a of wall 38 is of larger diameter than the interior diameter of the pipeline, so that when the pig element is placed within a pipeline it is inwardly compressed or formed to the form 38a. Each of the gusset elements 44 is distorted and bent out of line as shown in FIG. 3. But each gusset 44 tends to move toward its relaxed position and shape when permitted to do so. Therefore, as wear at the outer surface of wall 38 occurs during passage of the pig element through a pipeline, the elements 44 each adjust toward their relaxed, flat condition, thereby serving as spring or biasing elements to retain the wall 38 snugly against the pipeline interior. This outward biasing action of the gussets 44 is more or less uniform and constant regardless of the amount of wearing of the outer surface of the wall 38 so that the tendency of the wall 38 to remain snugly against the pipeline interior remains constant and dependable throughout the life of the pig. This is in distinction to the characteristics of pigs currently in use, where outward wearing of the pig alters the outward flexing tendencies whereby the fit changes as the pig wears at its outer surface. Further, as has been mentioned, the built-in outward resiliency of the gussets 44 serves to maintain the pig elements precisely centered so that wearing at one side portion of the pig elements does not occur, and wear is uniform completely around the periphery of each pig element.

The wear around the outer surface of a pig element is largely confined to the rearward outer surface of the wall 38, which is the area relied on for forming a seal around the pig element in a pipeline. As should now be clear, the gussets 44 exert their outward resilient force over the full longitudinal width of wall 38 so that a reliable seal around each pig element is provided. The outer wearing is exceedingly uniform around each pig element, and it has been found that wear of the several pig elements is likewise uniform. In the case of pig elements heretofore used, it was generally true that more wear occurred at the pig elements located at intermediate positions, and lesser wear occurred at the forward and tail pig elements of a set.

Since the outward biasing resiliency of the gussets does not depend on confined compression of material of which the pig is made, but depends instead on flexure of the gussets, the outward force is uniform regardless of the extent of wear around the pig, so that the pigs perform dependably even after the wear has become quite large. Therefore, the pigs are satisfactory for use until the surrounding wall has worn completely through, and since the wear is uniform this does not occur at one wall portion while remaining wall portions remain relatively unworn.

The pigs may be made of any suitable elastomeric material, such as natural and synthetic rubbers, plastics, and the like. Internal reinforcement materials, such as fiberglass, may be incorporated in all or part of the structure. A fairly high degree of resiliency is desirable, i.e. the rubber, plastic, or the like, should not be too hard. Polyurethane plastics have been found to be useful. The material should be such as to be relatively unaffected by the substances with which the pigs will come into contact in the pipelines.

Since the pig elements provided by the invention are capable of being distended inwardly by a large amount, the elements are capable of use in pipelines having normal bends customarily employed by such pipelines.

I claim:

1. Pig apparatus for use in circular conduits, comprising pig body means formed of elastomeric material and including circular wall means having flange means depending in one direction therefrom around the periphery thereof and including a plurality of spaced gusset means each depending between said flange means and a contiguous outer portion of said wall means, said flange means being outwardly conically convergent toward the periphery of said wall means, whereby when said pig body means is placed in a conduit of lesser interior diameter than the diameter across said flange means and of greater diameter than the diameter of said wall means said gusset means will be deformed and will bias said flange means outwardly against the interior of said conduit.

2. The combination of claim 1, said gusset means being disposed radially and being spaced regularly around the periphery of said flange means.

3. The combination of claim 2, said gusset means having wall thicknesses less than the thickness of said flange means.

4. The combination of claim 2, said circular wall being relieved at its outer peripheral portion from which said gusset means extend.

5. The combination of claim 1, said pig apparatus comprising a plurality of said pig body means disposed coaxially spaced apart, and including means connecting said pig bodies into a unit.

6. The combination of claim 5, said connecting means including rigid support means disposed flushly against each side of the circular wall means of each said pig body, each said rigid support means terminating outwardly within the interior diameter of a conduit in which the pig apparatus may be disposed for use, said pig apparatus including spacer means between adjacent pig bodies.

References Cited

UNITED STATES PATENTS 2,737,205 3/1956 Stringfield _____ 138—89
3,025,118 3/1962 Ver Nooy _____ 15—104.06 X
3,394,025 7/1968 McCune _____ 118—105 X EDWARD L. ROBERTS, Primary Examiner U.S. Cl. X.R.

118—105